United States Patent [19]

Green et al.

[11] Patent Number: 5,149,754
[45] Date of Patent: Sep. 22, 1992

[54] STAIN-RESISTANT POLYMERS DERIVED FROM ITACONIC ACID USEFUL AS COATINGS FOR FIBERS

[75] Inventors: George D. Green, Park Ridge, Ill.; Stephen A. Munk, West Lafayette, Ind.; Darryl K. Barnes, Bellwood, Ill.

[73] Assignee: Allied-Signal Inc, Morris Township, Morris County, N.J.

[21] Appl. No.: 670,659

[22] Filed: Mar. 18, 1991

Related U.S. Application Data

[62] Division of Ser. No. 512,227, Apr. 19, 1990, Pat. No. 5,006,408, which is a division of Ser. No. 292,862, Jan. 3, 1989, Pat. No. 4,925,906.

[51] Int. Cl.$^5$ .............................................. C08F 32/00
[52] U.S. Cl. ..................................... 526/309; 526/318; 428/395
[58] Field of Search ................. 526/318.2, 321, 308, 526/318, 309; 428/395

[56] References Cited

U.S. PATENT DOCUMENTS

| | | | |
|---|---|---|---|
| 3,219,596 | 11/1965 | Hull et al. | 526/321 |
| 3,282,905 | 11/1966 | Fasick et al. | 526/229 |
| 3,442,844 | 5/1969 | Bouchard et al. | 536/321 |
| 3,645,989 | 2/1972 | Tandy, Jr. | 526/245 |
| 3,764,587 | 10/1973 | Zunker | 526/318.2 |
| 3,765,849 | 10/1973 | Ilnyckyj et al. | 526/321 |
| 3,923,752 | 12/1975 | Guse et al. | 526/321 |
| 4,147,852 | 4/0379 | Bozzelli et al. | 526/228 |

FOREIGN PATENT DOCUMENTS

| | | | |
|---|---|---|---|
| 494415 | 7/1953 | Canada | 526/321 |
| 0264871 | 4/1988 | European Pat. Off. | 526/318.2 |
| 42-1793 | 1/1967 | Japan | 526/318.2 |
| 46-28417 | 8/1971 | Japan | 526/318.2 |
| 61-2753 | 1/1986 | Japan | 526/308 |
| 63-51478 | 3/1988 | Japan | 526/318.2 |
| 2-214731 | 8/1990 | Japan | 526/321 |
| 1125612 | 8/1968 | United Kingdom | 526/321 |

OTHER PUBLICATIONS

"Polymerization Reactions of Itaconic acid and some of its derivatives" Journal of Organic Chemistry, 24,599 (1959) Marvel et al.

*Primary Examiner*—Joseph L. Schofer
*Assistant Examiner*—N. Sarofim

[57] ABSTRACT

The present invention relates to non-halogenated hydrocarbon polymeric compositions which impart durable stain resistance to fibrous substrates, particularly nylon containing articles. In addition, it relates to fluorine containing polymeric compositions which impart durable stain resistance to fibrous substrates as above. It relates also to processes in which such substrates are treated so as to impart durable stain resistance to them. It relates further to a manufacturing process for preparing the compositions of the invention.

9 Claims, No Drawings

STAIN-RESISTANT POLYMERS DERIVED FROM ITACONIC ACID USEFUL AS COATINGS FOR FIBERS

This application is a division of application Ser. No. 512,227, filed Apr. 19, 1990 and issued as U.S. Pat. No. 5,006,408, which is a division of application Ser. No. 292,862, filed Jan. 3, 1989 and issued as U.S. Pat. No. 4,925,906.

BACKGROUND OF THE INVENTION

The patent literature contains significant precedent in the use of addition type polymers for use as stain resistant coatings on fibrous materials (e.g. U.S. Pat. No. 4,695,497). There is not, however, precedent on the use of polymeric materials based largely on difunctional monomers, e.g. itaconic acid, as stain resistant coatings are particularly advantageous in that they are comprised mainly of low toxicity monomers derived from a renewable resource, e.g. itaconic acid.

SUMMARY OF INVENTION

The non-fluorine containing polymeric compositions of the present invention consist essentially of pure polymers or mixtures of (1) an addition polymer of a least one monomer having the formula (A)

$$H_2C=C\begin{matrix}H_2C-CO_2R_1\\ \\CO_2R_2\end{matrix} \quad (A)$$

where $R_1 = H$, $C_5-C_{22}$ alkyl, $$-(CH_2)_m-X-CH\begin{matrix}CH_2-(CH_2)_n\\ \\ \\CH_2-CH_2\end{matrix}$$

cyclobutyl, cyclopentyl, cyclohexyl, cycloheptyl;
$m = 0-12$;
$n = 0, 1, 2, 3$;
$X = CH_2$, O when $m > 1$,
$R_2$ is chosen from the list above and may or may not be the same as $R_1$, $R_1$ and $R_2$ cannot both be H, and P1 (2) an addition copolymer of (a) at least one monomer having the formula described as (A) above,
(b) and may include one or more of the monomer (B)

$$H_2C=C\begin{matrix}H_2C-COOH\\ \\COOH\end{matrix} \quad (B)$$

$$H_2C=C\begin{matrix}R_3\\ \\COOH\end{matrix}$$

$$H_2C=C\begin{matrix}O\\ \|\\ \diagdown O\\ \diagup \\ O\end{matrix}$$

$$O=C\begin{matrix}\diagdown\\O\end{matrix}C=O$$

(c) and may include one or more of the monomers, of the formula $$H_2C=C\begin{matrix}R_3\\ \\CO_2R_4\end{matrix} \quad (C)$$

where $R_3$ is H or $CH_3$ $R_4$ is $C1-c_{22}$ alkyl, $$-(CH_2)_m-X-CH\begin{matrix}CH_2-(CH_2)_n\\ \\ \\CH_2-CH_2\end{matrix},$$

cyclobutyl, cyclopentyl, cyclohexyl, cycloheptyl;
$m = 0-12$;
$n = 0, 1, 2, 3$;
$X = CH_2$, 0 (when $m > 10$.

The fluorine-containing compositions of the present invention consist essentially of copolymers of
(1) at least one monomer having the formula (A) as above
(2) at least one monomer having the formula (d) $CF_3CF_2(CF_2)X(CH_2)YOC(O)C(R_3)=CH_2$ wherein
X is an integer from 2–18
Y is an integer from 1–15, $R_3$ is H or $CH_3$ and
(3) optionally monomer having the formula $$H_2C=C\begin{matrix}H_2C-CO_2R_5\\ \\CO_2R_6\end{matrix} \quad (E)$$

where $R_5$ and $R_6$ may be H, $CF_3CF_2(CF_2)X(CH_2)Y$, but $R_5$ and $R_6$ cannot both be H wherein
X is an integer from 2–18
Y is an integer from 1–15

For the non-fluorinated hydrocarbon polymers, the preferred polymeric composition should be as follows: Based upon the total weight of the composition, monomer A would constitute between 20 and 100 percent by weight; monomer B would constitute between 0 and 20 percent by weight; monomer C would constitute 0 to 80 percent by weight. More preferably, monomer A would constitute between 70 and 100 weight percent; monomer B would constitute between 1 and 10 weight percent and monomer C would constitute between 0 and 30 percent by weight. The total number of carboxylic acid end groups should not exceed, on the average, one per two monomer units.

The polymer non-fluorinated hydrocarbon polymers of the present invention are useful in imparting durable stain resistance to a wide range of fibrous materials.

For the fluorine containing copolymers, the preferred polymeric composition should be as follows: based upon the total weight of the composition, monomer A would constitute between 20 and 90 percent by weight and monomer D would constitute between 10 and 80 percent by weight and monomer E would constitute between 0 and 80 percent be weight. More preferably, the fluorinated monomers would constitute between 40 and 60 weight percent and monomer A would constitute 40 to 60 weight percent.

The polymeric fluorinated compositions of the present invention are useful in imparting stain resistance to fibrous materials as well.

The polymeric compositions of the present invention can be prepared by using well known polymerization techniques and conditions. They can be prepared using bulk, solution, suspension or emulsion technologies. Preferably, the polymerization process of this invention is run using an emulsion technique. In the most preferred technique, the monomers are combined with nonionic and anionic surfactants and water to form a dispersion. Initiator, preferably 0.5 to 2 mole percent based on monomers, is then added. The rection is then carried out at a temperature sufficient to promote efficient initiation. In bulk polymerization, the temperature will be sufficient to keep the monomers in the carried out a a temperature sufficient to promote efficient initiation. In bulk polymerization, the temperature will be sufficient to keep the monomers in the molten state.

The fluorinated monomers most preferred for the present invention are (meth) acrylate mixtures such that their perfluoroalkyl groups consist mainly of A=2, 4, 6, 8, 10, 12 and B=2. Such materials are described in U.S. Pat. Nos. 3,282,905, 4,147,852 and 3,645,989.

Conventional free radical initiators such as peroxy compounds and azo compounds may be used. Examples are benzoyl peroxide, 2,2'-azo-bis(2-methylpropionitrile), hereinafter AIBM, potassium persulfate and the like. Initiator concentration should be between 0.5 and 2.0 percent based on the total moles of the monomers. Likewise, conventional chain transfer agents, such as carbon tetrachloride and dodecyl mercaptan in amounts sufficient to control the molecular weight, may be used but are not always necessary.

DETAILED DESCRIPTION OF THE INVENTION

The following tests were used to evaluate the end use properties of the polymeric compositions of the invention on woven nylon sleeve.

EXAMPLE 1

A 3-liter polymerization vessel charged with bis(cyclohexylmethyl) itaconate (1500 g, 4.65mol), AIBN (15.3 g, 2 mol %) and toluene (300 ml). The flask was flushed with argon and cooled in a dry ice/acetone bath. The contents of the flask were degassed via 4 cycles of argon purge followed by evacuation to 0.5 torr. The vessel was then flushed with argon, protected from the atmosphere with an oil bubbler and placed in a 60 C. water bath. After two days the vessel was cooled and the viscous mixture was diluted with tetrahydrofuran (2000 ml). The polymer solution was then slowly added to vigorously stirred methanol (8000 ml). The precipitated product was then collected via filtration and dried under vacuum at 50 C. White glassy product was obtained in 78% yield. An aliquot of the polymer (0.1 g) was disolved in dichloromethane (15 ml). White nylon sleeve (5.0 g) was dipped in the solution with agitation and squeezing to ensure penetration of the liquid into the fiber bundles. The sample was then air dried followed by annealing at 105 C. for 15 minutes. The samples were stained, washed and rated as described below. The stain repellancy is set forth in Table 1 and wash durability is in Table II.

EXAMPLE 2

A polymerization vessel was charged with bis(-docosyl)itaconate (17.5 g, 0.023 mol), bis(octyl)itaconate (8.3 g, 0.023 m ol) and IABN (0.15 g, 2 mol percent). The flask was sealed and degassed under argon via four vacuum/purge cycles. The sealed flask was then placed in a 75° C. bath for 24 hours. The molten mass solidified upon cooling. An aliquot of the polymer was coated onto nylon and treated as above.

EXAMPLE 3

A polymerization vessel was charged with bis(cyclohexylmethyl)itaconate (3.0 g, 9.3 mmol), DuPont Fluoroacrylate Telomer B (2.0 g, 3.8 mmol)-$\alpha,\alpha,\alpha$, trifluorotoluene (1.0 ml) and AIBN (0.043 g, 2 mol %). The flask was flushed with argon and cooled in a dry ice/acetone bath. The contents of the flask were degassed via 4 cycles of argon purge followed by evacuation to 0.5 torr. The vessel was then flushed with argon, sealed, and placed in a 60° C. water bath. After two days the vessel was cooled, and the viscous mixture was diluted with tetrahydrofuran (100 ml). The polymer solution was then slowly added to vigorously stirred methanol (800 ml). The precipitated product was then collected via filtration and dried under vacuum at 50 C. White glassy product was obtained in 88% yield. An aliquot of the polymer was coated onto nylon and treated as above.

EXAMPLE 4

A polymerization vessel was charged with bis(cyclohexylmethyl)itaconate (5.0 g), Makon 8 surfactant (0.5 g) deionized water (9.0 ml) and potassium persulfate (0.07 g). Vigorous stirring was started and thee vessel was purged with argon for one hour. The sealed vessel was then placed in a 50 C. bath with continued stirring. After 18 hours, the mixture was cooled and treated with methanol (200 ml). The white solid product (4.5 g, 90%) was collected via filtration and dried under vacuum at 50 C. An aliquot of the polymer was coated onto nylon and treated as above.

STAIN TESTING AND WASH DURABILITY

Experimental

Coating Procedure: White nylon-6 sleeve (~5 g) was dipped into a $CH_2Cl_2$ solution (15 ml) containing the polymer (0.1 g) to be tested. All of the solution was absorbed and worked into the fiber. The sleeve was then air dried followed by annealing at 105° C. for 15 minutes.

Kool Aid Staining

The nylon swatch to be tested was placed in a large petrie dish. Unsweetened Cherry Kool Aid (30 ml) was poured, from a height of two inches, onto the sleeve. After standing for 5 minutes, the swatch was cleaned with cold tap water and paper towels. The samples were allowed to air dry before stain ranking.

Coffee Staining

The nylon swatch to be tested was placed in a large petrie dish. Coffee, prepared in a drip coffee maker using 100 ml solid grounds (Maxwell House ADC) per liter of water, was poured 30 ml, 71 C. from a height of 2 inches, onto the sleeve. After standing for 5 minutes, the sample was cleaned and ranked.

Mustard Staining

The nylon swatch to be tested was placed in a large petrie dish. Mustard (2 grams) was dropped onto the fiber from a height of 2 inches. After standing for 5 minutes, the sleeve was cleaned and ranked.
Stain Ranking: The dry sample was sandwiched between a white background and a standard stain scale. Numerical rankings were obtained by matching the stain to the scale. A rating of 0 indicates no visible stain and 8 represents a severe stain.
Durability Testing: A nylon sleeve coated and annealed as above was subjected to a standard soap solution at 25° C. (cold wash) or 60° C. (hot wash) for 5 minutes with agitation. The sample was rinsed well with cold tap water, dried by blotting followed by air drying. The dry sample was then stained and ranked as above.

TABLE I

| Itaconate Homo and Co-polymer Stain Rankings | | | | | |
|---|---|---|---|---|---|
| 1A | 2A | 2D | | Kool | Mus- |
| $R_1$ & $R_2$ | $R_1$ & $R_2$ | $R_6$ | $R_5$ | Aid ™ Coffee | tard |
| 2-pentyl | — | — | — | 3.0 4.0 | 1.5 |
| 1-octyl | — | — | — | 3.0 4.5 | 1.5 |
| 1-dodecyl | — | — | — | 5.0 5.0 | 3.0 |
| 1-octadecyl | — | — | — | 2.0 6.5 | 2.0 |
| 1-docosyl | — | — | — | 5.0 3.0 | 3.0 |
| cyclohexyl-methyl | — | — | — | 6.0 5.0 | 3.0 |
| 1-docosyl | 2-pentyl | — | — | 1.5 5.0 | 1.5 |
| 1-docosyl | 1-octyl | — | — | 1.0 2.0 | 0.5 |
| 1-octadecyl | 1-octyl | — | — | 3.0 3.0 | 1.0 |
| cyclohexyl-methyl | 2-pentyl | — | — | 6.0 4.0 | 1.0 |
| 1-octadecyl | 1-docosyl | — | — | 5.0 4.0 | 1.0 |
| cyclohexyl-methyl | perfluoro-alkyl | H | | 3.0 0.5 | 0.5 |
| untreated | — | — | — | 8.0 8.0 | 6.0 |

TABLE I-continued

| Itaconate Homo and Co-polymer Stain Rankings | | | | | |
|---|---|---|---|---|---|
| 1A | 2A | 2D | | Kool | Mus- |
| $R_1$ & $R_2$ | $R_1$ & $R_2$ | $R_6$ | $R_5$ | Aid ™ Coffee | tard |
| sleeve | | | | | |

The column headings 1A, 2A and 2D refer to the compounds so designated in the summary of Invention above. In 2D, Y is 2 and X is various values from 3 to 8. The perfluoroalkyl precursor is duPont Telomer B acrylate.

TABLE II

| WASH DURABILITY | | | | | | |
|---|---|---|---|---|---|---|
| 1A | 2A | 2D | | Wash | Number | Kool Aid ™ |
| $R_1$ & $R_2$ | $R_1$ & $R_2$ | $R_6$ | $R_5$ | Conditions | washes | Stain |
| Cyclohexyl-methyl | — | — | — | Cold | 1 | 7.0 |
| Cyclohexyl-methyl | — | — | — | Cold | 2 | 7.5 |
| Cyclohexyl-methyl | — | — | — | Hot | 1 | 3.0 |
| 1-octyl | 1-docosyl | — | — | Cold | 1 | 2.0 |
| 1-octyl | 1-docosyl | — | — | Cold | 2 | 3.5 |
| 1-octyl | 1-docosyl | — | — | Hot | 1 | 3.0 |
| Cyclohexyl-methyl | — | perfluoro-alkyl | H | Cold | 1 | 3.0 |
| Untreated Sleeve | — | — | — | Cold | 1 | 8.0 |
| Untreated Sleeve | — | — | — | Hot | 1 | 7.5 |

We claim:
1. A polymeric composition useful as a stain resistant coating on substrates, the polymeric composition comprising
an addition polymer formed from at least one monomer, selected only from the group having the formula

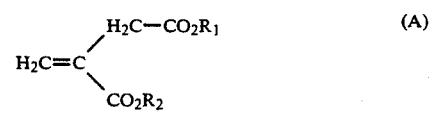

(A)

where $R_1$ is H, $C_5$–$C_{22}$ alkyl,

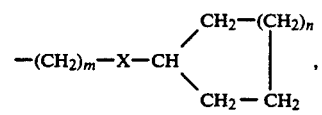

cyclobutyl, cyclopentyl, cyclohexyl, or cycloheptyl;
m=0–12;
n=0, 1, 2, or 3;
X=$CH_2$, 0 when m>1, and
$R_2$ is chosen from the list above and may or may not be the same as $R_1$, except $R_1$ and $R_2$ cannot both be H.
2. The composition of claim 1 wherein the substrate is a fiber.
3. The composition of claim 2 wherein the fiber is nylon.
4. A stain resistant coated fiber wherein the coating comprises an addition polymer formed from at least one monomer having the formula (A)

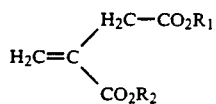 (A)

wherein $R_1$ is H, $C_5$-$C_{22}$ alkyl,

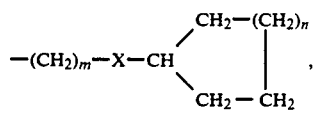

cyclobutyl, cyclopentyl, cyclohexyl, or cycloheptyl;
m=0-12;
n=0, 1, 2, or 3;
x=$CH_2$, O when m>1, and
$R_2$ is chosen from the list above and may or may not be the same as $R_1$, except $R_1$ and $R_2$ cannot both be H; and
(b) optionally at least one monomer (B) selected from the group consisting of

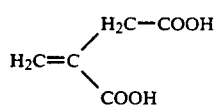 (B)

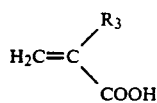

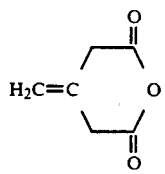

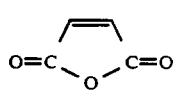

(c) and optionally at least one monomer, (C) of the formula

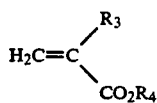 (C)

wherein
$R_3$ is H or $CH_3$ and
$R_4$ is $C_1$-$C_{22}$ alkyl,

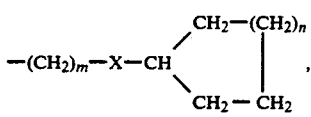

cyclobutyl, cyclopentyl, cyclohexyl, or cycloheptyl;

m=0-12;
n=0, 1, 2, or 3;
x=$CH_2$, O when m>1.

5. A stain resistant coated fiber according to claim 4 wherein the fiber comprises nylon.

6. A stain resistant coated fiber according to claim 4 wherein the coating comprises a polymeric composition formed from 20-100 weight percent of monomer A, 0-20 weight percent of monomer B and 0-80 weight percent of monomer C, based upon the total weight of the composition.

7. A stain resistant coated fiber according to claim 6 wherein the polymeric composition is formed from 70-100 weight percent of monomer A, 1-10 weight percent of monomer B and 0-30 weight percent of monomer C, based upon the total weight of the composition.

8. A stain resistant coated fiber according to claim 4 wherein the coating is water insoluble.

9. A fibrous material comprised of a plurality of stain resitant coated fibers wherein the coating comprises
an addition polymer formed from at least one monomer having the formula (A)

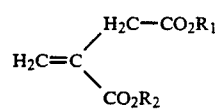 (A)

wherein $R_1$ is H, $C_5$-$C_{22}$ alkyl,

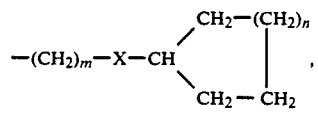

cyclobutyl, cyclopentyl, cyclohexyl, or cycloheptyl;
m=0-12;
n=0, 1, 2, or 3;
x=$CH_2$, O when m>1, and
$R_2$ is chosen from the list above and may or may not be the same as $R_1$, except $R_1$ and $R_2$ cannot both be H; and
(b) optionally at least one monomer (B) selected from the group consisting of

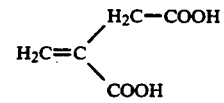 (B)

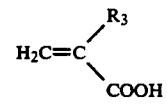

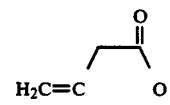

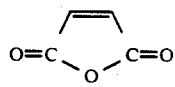
(c) and optionally at least one monomer (C) of the formula
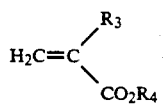 (C)
wherein
$R_3$ is H or $CH_3$ and
$R_4$ is $C_1$–$C_{22}$ alkyl,
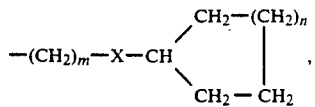
cyclobutyl, cyclopentyl, cyclohexyl, or cycloheptyl;
m=0–12;
n=0, 1, 2, or 3;
x=$CH_2$, O when m>1.
* * * * *